(12) United States Patent
Jiang

(10) Patent No.: US 8,243,645 B2
(45) Date of Patent: Aug. 14, 2012

(54) METHOD AND APPARATUS FOR ENHANCING TRANSMISSION EFFICIENCY IN A WIRELESS COMMUNICATIONS SYSTEM

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 1179 days.

(21) Appl. No.: 12/030,882

(22) Filed: Feb. 14, 2008

(65) Prior Publication Data
US 2008/0194248 A1 Aug. 14, 2008

Related U.S. Application Data

(60) Provisional application No. 60/889,747, filed on Feb. 14, 2007.

(51) Int. Cl.
*H04W 4/00* (2009.01)
*H04W 80/00* (2009.01)
*H04L 12/56* (2006.01)

(52) U.S. Cl. ........ 370/312; 370/349; 370/390; 370/394; 370/469; 455/422.1

(58) Field of Classification Search .................. 370/312, 370/349, 390, 394, 469; 455/422.1
See application file for complete search history.

(56) References Cited

U.S. PATENT DOCUMENTS

| | | | |
|---|---|---|---|
| 6,765,885 B2 * | 7/2004 | Jiang et al. | 370/328 |
| 6,961,349 B2 * | 11/2005 | Malomsoky et al. | 370/469 |
| 7,054,270 B2 * | 5/2006 | Yi et al. | 370/232 |
| 7,130,295 B2 * | 10/2006 | Kim et al. | 370/349 |
| 7,400,893 B2 * | 7/2008 | Yi et al. | 455/466 |
| 7,606,226 B2 * | 10/2009 | Yi et al. | 370/390 |
| 7,633,892 B2 * | 12/2009 | Yi et al. | 370/312 |
| 7,864,798 B2 * | 1/2011 | Chandra et al. | 370/466 |
| 2005/0147040 A1 | 7/2005 | Vayanos | |
| 2007/0177608 A1 * | 8/2007 | Ding | 370/395.6 |
| 2008/0175249 A1 * | 7/2008 | Yi et al. | 370/394 |
| 2008/0225765 A1 * | 9/2008 | Marinier et al. | 370/310 |
| 2008/0225891 A1 * | 9/2008 | Cave et al. | 370/472 |
| 2009/0046626 A1 * | 2/2009 | Shao et al. | 370/320 |
| 2009/0052401 A1 * | 2/2009 | Nakajima | 370/331 |

FOREIGN PATENT DOCUMENTS

| | | |
|---|---|---|
| JP | 2006311564 A | 11/2006 |
| WO | 2005/117317 A1 | 12/2005 |
| WO | 2006073261 A1 | 7/2006 |

OTHER PUBLICATIONS

LG Electronics Inc.:"Transmission of RRC Connection Setup message" 3GPP TSG-RAN WG2 #53, R2-061335, XP002495150, May 8-12, 2006.
LG Electronics Inc. Samsung: "Introduction of DAR mechanism on CCCH" 3GPP TSG-RAN WG2 Meeting #57, R2-070464, XP002495151, Feb. 12-16, 2007.
3GPP TS 25.322 V7.2.0 (Sep. 2006). R2-070462, "Use of DAR over CCCH", LG Electronics Inc. and Samsung, 3GPP RAN2 #57, Feb. 2007.
R2-070465, "Introduction of DAR mechanism on CCCH", LG Electronics Inc. and Samsung, 3GPP RAN2 #57, Feb. 2007.
R2-070512, "MAC-hs header structure", Nokia, 3GPP RAN2 #57, Feb. 2007.
R2-070731, "MAC-hs header format for the enhanced L2", Samsung, 3GPP RAN2 #57, Feb. 2007.
R2-070885, "MAC header for control message in LTE", ASUSTeK, 3GPP RAN2 #57, Feb. 2007.

* cited by examiner

*Primary Examiner* — Alpus H Hsu
(74) *Attorney, Agent, or Firm* — Blue Capital Law Firm, P.C.

(57) ABSTRACT

A method for enhancing transmission efficiency in a wireless communications system includes a first protocol entity of the wireless communications system always performing a duplication avoidance and reordering, called DAR hereinafter, function on a logic channel, without referring to a configuration of the DAR function by an upper-layer protocol entity.

12 Claims, 3 Drawing Sheets

METHOD AND APPARATUS FOR ENHANCING TRANSMISSION EFFICIENCY IN A WIRELESS COMMUNICATIONS SYSTEM

CROSS REFERENCE TO RELATED APPLICATIONS

This application claims the benefit of U.S. Provisional Application No. 60/889,747, filed on Feb. 14, 2007 and entitled "Method and apparatus of MAC header and UM reordering function," the contents of which are incorporated herein by reference.

BACKGROUND OF THE INVENTION

1. Field of the Invention

The present invention relates to a method and apparatus for enhancing transmission efficiency in a wireless communications system, and more particularly, to a method and apparatus for decreasing overhead and transmission time, and enhancing transmission efficiency.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

The Access Stratum (AS) of the 3G mobile communications system comprises various protocol stacks, such as Radio Resource Control (RRC), Radio Link Control (RLC), Media Access Control (MAC), Packet Data Convergence Protocol (PDCP), and Broadcast/Multicast Control (BMC). In addition, the 3G mobile communications system also provides different levels of transmission quality, and can operate in different corresponding modes according to different transmission quality requirements, such as: Transparent Mode (TM), Unacknowledged Mode (UM), and Acknowledged Mode (AM). TM is appropriate for use in services with high requirements for real-time transmission, UM is appropriate for use in services with requirements for real-time transmission and packet sequencing, and AM is appropriate for use in services with low requirements for real-time transmission, but high requirements for data accuracy.

In addition, the 3G mobile communications system can provide Multimedia Broadcast and Multicast Service (MBMS), which transmits service content (e.g., television programs, movies, commercials) from servers to each user equipment (UE) through different cells in Unacknowledged Mode (UM). Each UE may be located under coverage of many different cells. In other words, a UE can receive a same service content from different cells. Thus, in order to correctly process the service content and take advantage of this multi-route transmission characteristic, the prior art provides a Duplicate Avoidance and Reordering (DAR) function in UM RLC entity, to efficiently combine Protocol Data Units (PDUs) that may be transmitted from different sources (cells) and/or retransmitted from a same source, to form a PDU sequence with a correct order. After initiating the DAR function, the RLC entity executes duplicate PDU detecting, discarding and reordering operations according to Sequence Numbers (SNs) of the PDUs.

The DAR function can decrease block error rate of MBMS point-to-multipoint Traffic Channel (MTCH), which supports data transmission in MBMS services. Besides, the prior has applied the DAR function on Common Control Channel (CCCH), to decrease error rate of control messages transmitted on the CCCH, so as to decrease transmission time.

In order to apply the DAR function on CCCH, the upper layer (e.g. RRC layer) needs to send specified signaling, such as IE "DL Duplication Avoidance and Reordering info", to UM RLC entity, which increases overhead and decreases transmission efficiency.

SUMMARY OF THE INVENTION

According to the present invention, a method for enhancing transmission efficiency in a wireless communications system comprises a first protocol entity of the wireless communications system always performing a duplication avoidance and reordering, called DAR hereinafter, function on a logic channel, without referring to a configuration of the DAR function by an upper-layer protocol entity.

According to the present invention, a communications device of a wireless communications system utilized for enhancing transmission efficiency comprises a control circuit for realizing functions of the communications device, a processor installed in the control circuit for executing a program code to operate the control circuit, and a memory coupled to the processor for storing the program code. The program code comprises a first protocol entity of the communications device always performing a duplication avoidance and reordering, called DAR hereinafter, function on a logic channel, without referring to a configuration of the DAR function by an upper-layer protocol entity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
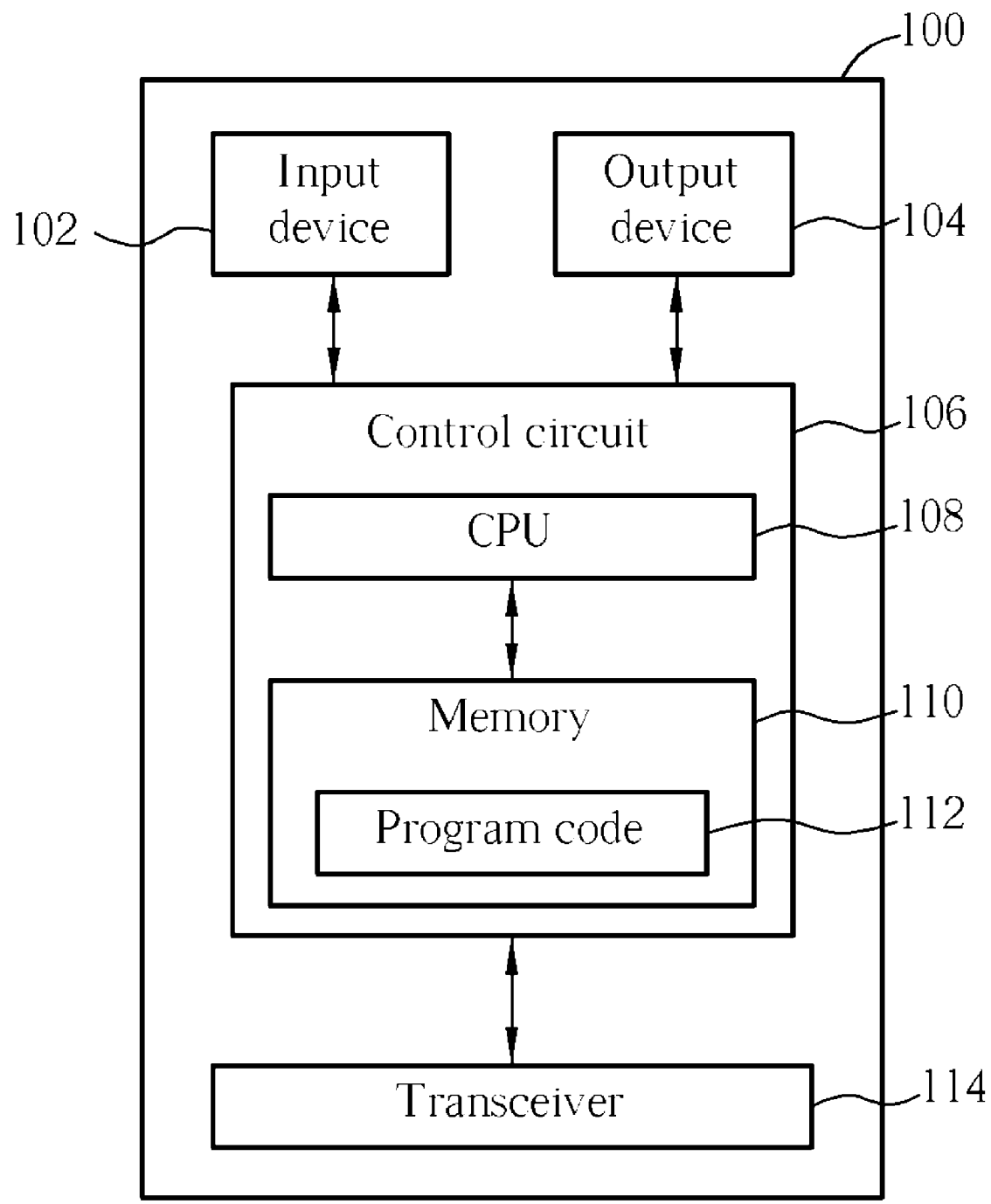
FIG. 1 is a function block diagram of a wireless communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
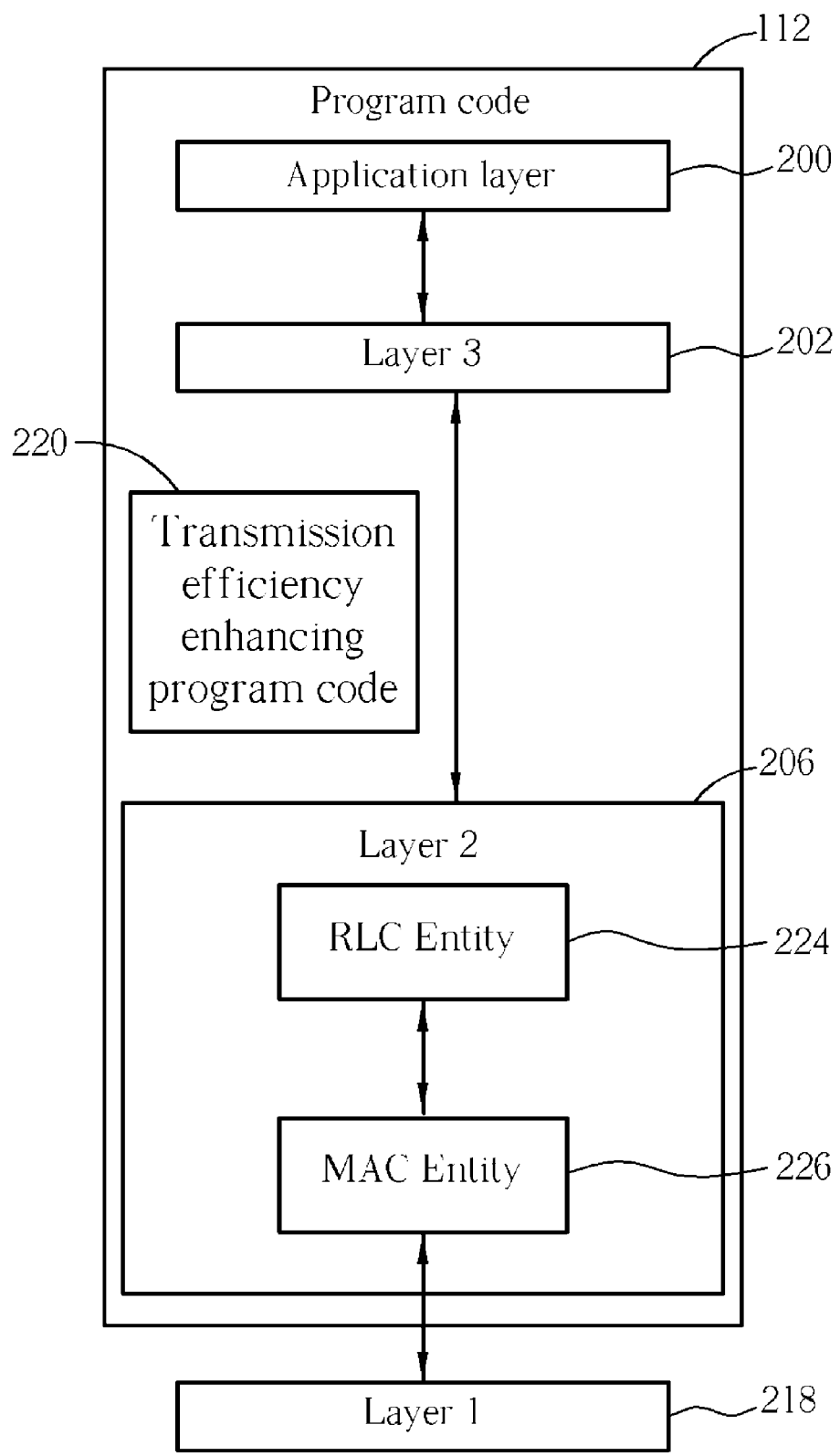
FIG. 2 is a diagram of program code of FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Figure 3:
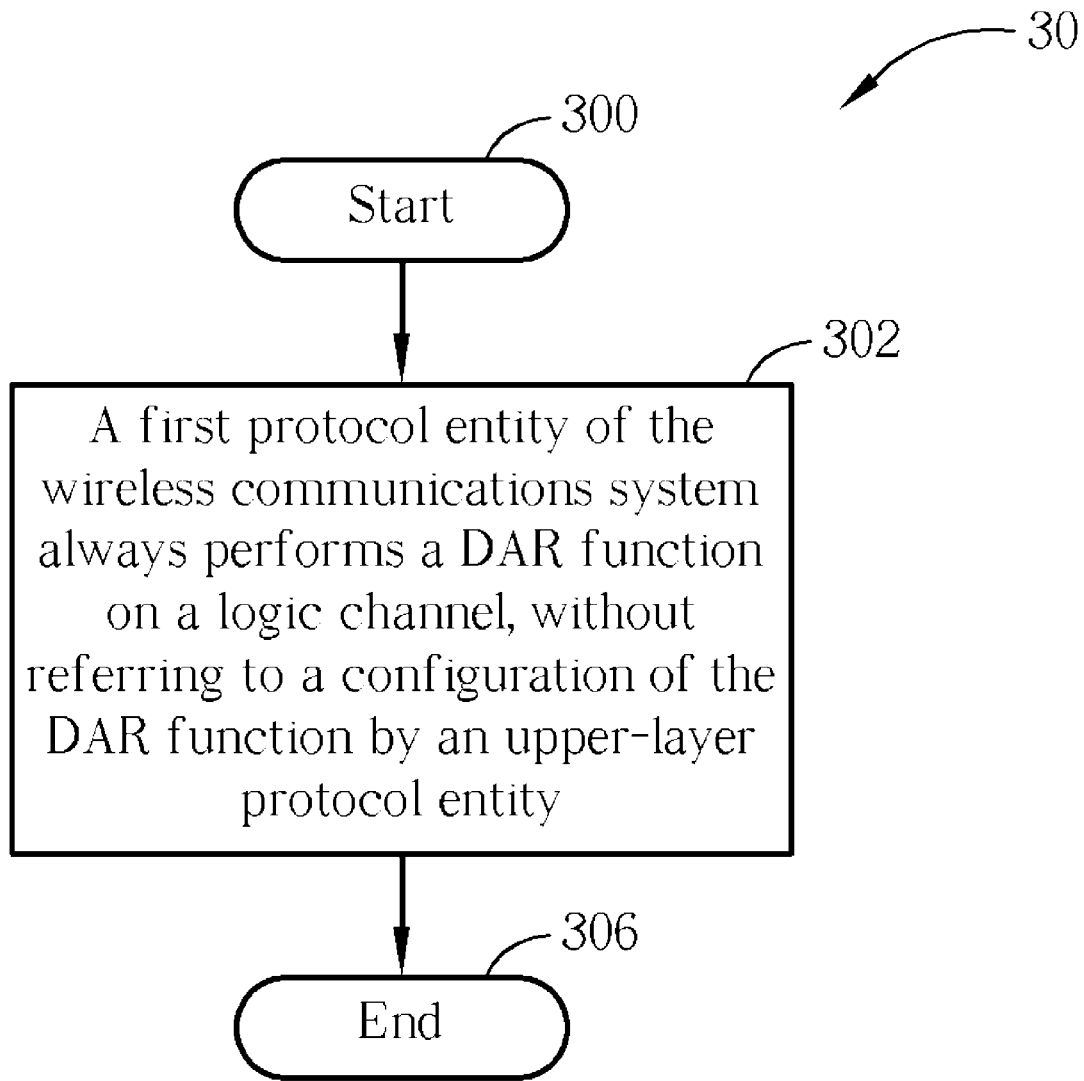
FIG. 3 is a flowchart of a process according to an embodiment of the present invention.

In order to decrease error rate of logic channels and transmission time, the RLC entity 224 can trigger the DAR function, so as to execute duplicate PDU detecting, discarding and reordering operations. In such a situation, the embodiment of the present invention provides a transmission efficiency enhancing program code 220, to reduce signaling of the upper layer (the Layer 3 202), and enhance transmission efficiency. Please refer to FIG. 3, which illustrates a schematic diagram of a process 30 according to an embodiment of the present invention. The process 30 is utilized for enhancing transmission efficiency in a wireless communications system, and can be compiled into the transmission efficiency enhancing program code 220. The process 30 comprises the following steps:

Step 300: Start.

Step 302: A first protocol entity of the wireless communications system always performs a DAR function on a logic channel, without referring to a configuration of the DAR function by an upper-layer protocol entity.

Step 306: End.

According to the process 30, the first protocol entity always performs the DAR function on the logic channel, and does not refer to whether the upper-layer protocol entity configures the first protocol entity to perform the DAR function. Preferably, the first protocol entity is UM RLC entity, while the logic channel can be CCCH or MTCH for transmitting control messages or MBMS data messages. In addition, an upper-layer protocol entity, such as RRC entity, corresponding to the first protocol entity in the wireless communications system does not output signaling for configuring the first protocol entity to perform the DAR function.

Therefore, via the embodiment of the present invention, when UM RLC entity supports the DAR function as a default on CCCH or MTCH, RRC signaling for configuring DAR function applicability is not needed. As a result, the embodiment of the present invention can decrease overhead of RRC entity, so as to decrease transmission time and enhance transmission efficiency. Note that, CCCH and MTCH are used to illustrate the embodiment of the present invention, and other logic channels can also be applied.

In summary, in the embodiment of the present invention, RRC entity does not need to output signaling for configuring RLC entity to perform the DAR function on a logic channel, so as to decrease overhead and transmission time, and enhance transmission efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enhancing transmission efficiency in a wireless communications system comprising:
a first protocol entity of the wireless communications system always performing a duplication avoidance and reordering (DAR) function on a logic channel, without referring to a configuration of the DAR function by an upper-layer protocol entity; and
wherein the first protocol entity is a radio link control entity operated in an unacknowledged mode.

2. The method of claim 1, wherein the DAR function is utilized for detecting and discarding duplicate packets on the logic channel, and reordering packets on the logic channel.

3. The method of claim 1, wherein the logic channel is a common control channel, utilized for transmitting control messages.

4. The method of claim 1, wherein the logic channel is a Multimedia Broadcast and Multicast Service point-to-multipoint Traffic Channel, utilized for transmitting data messages of Multimedia Broadcast and Multicast Service.

5. The method of claim 1, wherein the upper-layer protocol entity corresponding to the first protocol entity in the wireless communications system does not output signaling for configuring the first protocol entity to perform the DAR function.

6. The method of claim 5, wherein the upper-layer protocol entity is a radio resource control entity.

7. A communications device of a wireless communications system utilized for enhancing transmission efficiency comprising:
a control circuit for realizing functions of the communications device:
a processor installed in the control circuit to operate the control circuit; and
a memory coupled to the processor;
wherein the processor executes a program code stored in memory to:
perform a duplication avoidance and reordering (DAR) function on a logic channel always by a first protocol entity of the communication device, without referring to a configuration of the DAR function by an upper-layer protocol entity; and
wherein the first protocol entity is a radio link control entity operated in an unacknowledged mode.

8. The communications device of claim 7, wherein the DAR function is utilized for detecting and discarding duplicate packets on the logic channel, and reordering packets on the logic channel.

9. The communications device of claim 7, wherein e logic channel is a common control channel, utilized for transmitting control messages.

10. The communications device of claim 7, wherein the logic channel is a Multimedia Broadcast and Multicast Service point-to-multipoint Traffic Channel, utilized for transmitting data messages of Multimedia Broadcast and Multicast Service.

11. The communications device of claim 7, wherein upper-layer protocol entity corresponding to the first protocol entity in the wireless communications system does not output signaling for configuring the first protocol entity to perform the DAR function.

12. The communications device of claim 11, wherein the upper-layer protocol entity is a radio resource control entity.

* * * * *